(12) United States Patent
Chacko

(10) Patent No.: US 7,495,890 B2
(45) Date of Patent: Feb. 24, 2009

(54) METHOD OF IMPROVING CATHODE CONNECTION INTEGRITY IN SOLID ELECTROLYTIC CAPACITORS USING SECONDARY ADHESIVE

(75) Inventor: Antony Chacko, Greer, SC (US)

(73) Assignee: Kemet Electronics Corporation, Greenville, SC (US)

( * ) Notice: Subject to any disclaimer, the term of this patent is extended or adjusted under 35 U.S.C. 154(b) by 294 days.

(21) Appl. No.: 11/499,366

(22) Filed: Aug. 4, 2006

(65) Prior Publication Data
US 2008/0030929 A1    Feb. 7, 2008

(51) Int. Cl.
*H01G 9/00* (2006.01)
(52) U.S. Cl. ............... 361/523; 361/525; 361/528; 361/529; 361/516; 361/519
(58) Field of Classification Search ......... 361/523–525, 361/528–534, 540–541, 516–519; 29/25.01, 29/25.03
See application file for complete search history.

(56) References Cited

U.S. PATENT DOCUMENTS

| | | | |
|---|---|---|---|
| 6,423,104 B1 * | 7/2002 | Omori et al. | 29/25.03 |
| 6,765,784 B2 * | 7/2004 | Ohya et al. | 361/523 |
| 6,808,541 B2 * | 10/2004 | Maeda | 29/25.03 |
| 6,870,728 B1 * | 3/2005 | Burket et al. | 361/538 |
| 6,916,433 B2 | 7/2005 | Mitani et al. | |
| 6,972,943 B2 | 12/2005 | Kato et al. | |
| 6,975,503 B2 * | 12/2005 | Abe et al. | 361/533 |
| 7,218,506 B2 * | 5/2007 | Kobayashi et al. | 361/523 |

* cited by examiner

*Primary Examiner*—Nguyen T Ha
(74) *Attorney, Agent, or Firm*—Joseph T. Guy; Nexsen Pruet LLC

(57) ABSTRACT

A solid electrolytic capacitor body is attached to lead frame by a secondary adhesive and a method for forming the capacitor assembly. The assembly consists of a chip that has conductive adhesive formed on the cathode surface. Secondary adhesive is placed adjacent to the conductive adhesive. Lead frame is attached to these adhesives and the adhesives are cured simultaneously. Secondary adhesive can be thermally or UV cured. The solid electrolytic capacitor formed by this method showed improved adhesion between lead frame and capacitor body.

11 Claims, 3 Drawing Sheets

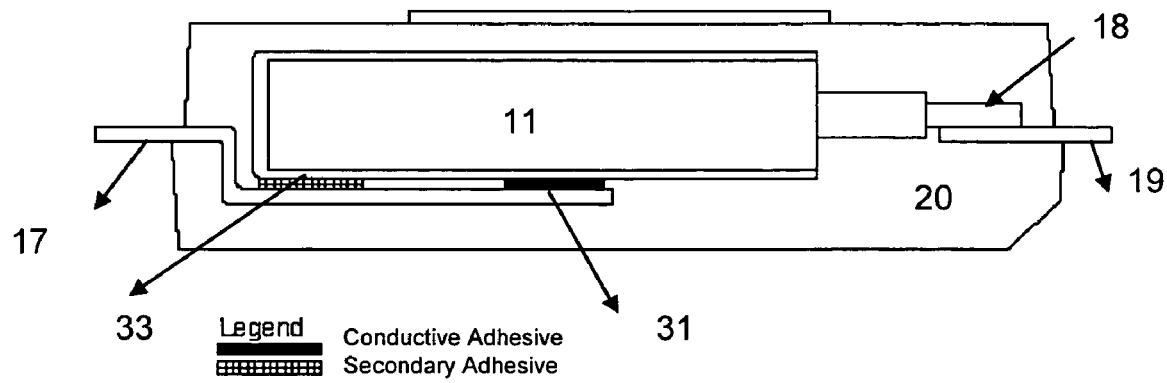
Fig 3A. Cross-section of secondary adhesive applied on the negative side of the negative lead
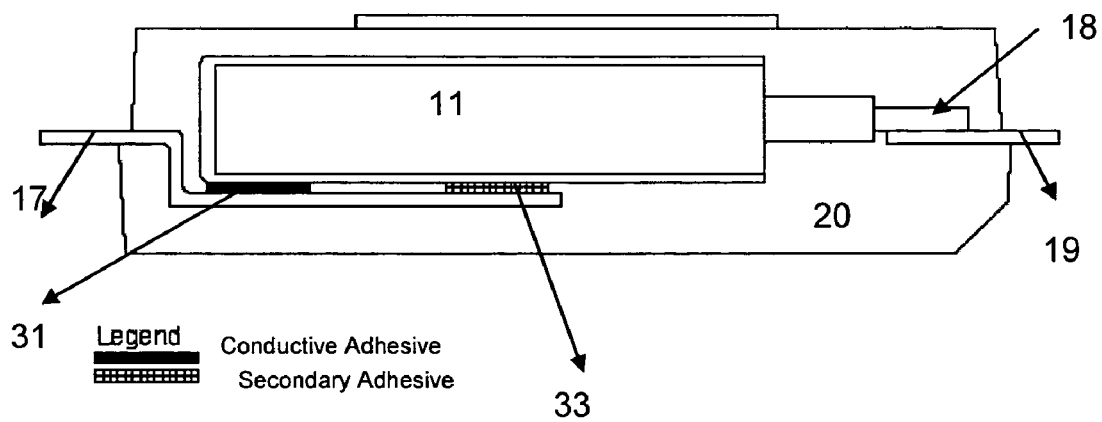
Fig 3B. Cross-section of secondary adhesive applied on the positive side of the negative lead

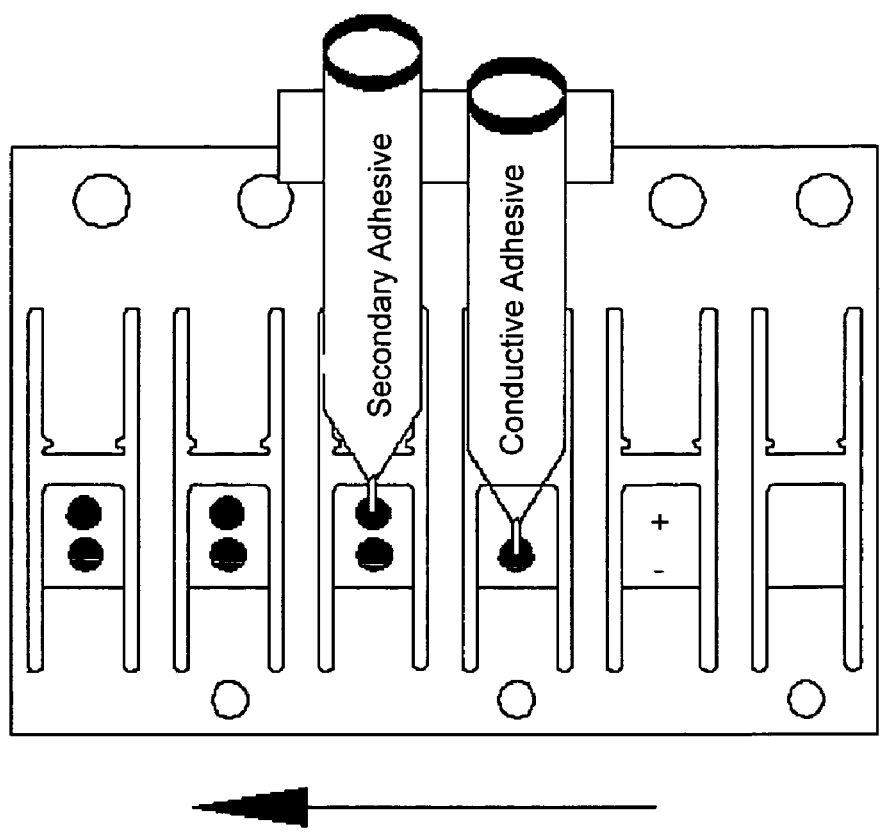
Fig 4. Dispense Method and Process. Drawing Illustrates secondary adhesive dispensed on the positive side of the negative lead

METHOD OF IMPROVING CATHODE CONNECTION INTEGRITY IN SOLID ELECTROLYTIC CAPACITORS USING SECONDARY ADHESIVE

FIELD OF THE INVENTION

The present invention is related to an improved method of forming a solid electrolytic capacitor and an improved capacitor formed thereby. More specifically, the present invention is related to a method of improving cathode (negative) connection integrity using a secondary adhesive adjacent to a conductive adhesive.

BACKGROUND OF THE INVENTION AND PRIOR ART

The construction and manufacture of solid electrolytic capacitors is well documented. In the construction of a solid electrolytic capacitor a valve metal serves as the anode. The anode body can be either a porous pellet, formed by pressing and sintering a high purity powder, or a foil which is etched to provide an increased anode surface area. An oxide of the valve metal is electrolytically formed to cover all surfaces of the anode and serves as the dielectric of the capacitor. The solid cathode electrolyte is typically chosen from a very limited class of materials, to include manganese dioxide and intrinsically conductive polymers such as polyaniline, polypyrrole, polythiophene etc. The solid cathode electrolyte is applied so that it covers all dielectric surfaces. An important feature of the solid cathode electrolyte is that it can be made more resistive by exposure to high temperatures. This feature allows the capacitor to heal leakage sites by Joule heating. In addition to the solid electrolyte the cathode of a solid electrolyte capacitor typically consists of several layers which are external to the body of the porous or etched anode body. In the case of surface mount constructions these layers typically include: a carbon layer; a layer containing a highly conductive metal, typically silver, bound in a polymer or resin matrix; a conductive adhesive layer such as solder or a silver adhesive; and a highly conductive metal lead frame. It is important that the solid electrolyte be of sufficient buildup and density to prevent the overlaying layers from penetrating the solid electrolyte and contacting the dielectric. The reason for this is that these outer layers do not exhibit the healing properties required for a material directly in contact with the dielectric. Thus the ability to control the buildup, morphology, uniformity, and density of the solid electrolyte is critical to manufacturing a reliable solid electrolytic capacitor. The various layers of the external cathode also serve to protect the dielectric from thermo-mechanical damage that may occur during subsequent processing, board mounting, or customer use.

In the case of conductive polymer cathodes the conductive polymer is typically applied by chemical oxidation polymerization, electrochemical oxidation polymerization or spray techniques with other less desirable techniques being reported.

The carbon layer serves as a chemical buffer between the solid electrolyte and the silver layer. Critical properties of the carbon layer include adhesion to the underlying layer, wetting of the underlying layer, penetration of the underlying layer, bulk conductivity, interfacial resistance, compatibility with the silver layer, buildup, and mechanical properties.

The silver layer serves to conduct current from the lead frame to the anode and around the anode to the sides not directly connected to the lead frame. The critical characteristics of this layer are high conductivity, adhesive strength to the carbon layer, wetting of the carbon layer, and mechanical properties. Compatibility with the subsequent layers employed in the assembly and encapsulation of the capacitor are also critical.

An electrically conductive adhesive is used to attach the silver layer to a lead frame. The electrical properties of the capacitor can be affected if the mechanical integrity of the adhesive/lead frame connection is degraded during assembly and post assembly processing. The adhesive properties of the conductive adhesive, the solder coating on the lead frame, the surface characteristics of lead frame, the coefficient of thermal expansion of the lead frame etc, are need to be carefully controlled in order to obtain durable negative connection integrity. The adhesive/lead frame interface is subjected to various thermomechanical stresses during molding, curing, aging, surface mount testing, solder reflow etc. These thermomechanical stresses and the low adhesive strength of the conductive adhesive cause stresses and lead to negative lead breaks. Adhesives with higher adhesive strengths and lower concentration of conductive particles are able to withstand the stress and maintain mechanical integrity. However, there is trade-off between increasing adhesion and increasing electrical conductivity.

Conductive adhesives are heavily filled with silver particles to get maximum conductivity. Increasing the silver loading decreases binder/resin concentration in the adhesive. The adhesion is contributed by the binder/resin portion of the adhesive. Increasing the resin portion will increase adhesion but decrease electrical properties. Improving electrical properties by increasing silver content will significantly decrease adhesive property of the conductive adhesive.

U.S. Pat. No. 6,972,943 attempts to circumvent the conflict between adhesion and conductivity of the adhesive by modifying the lead frame surface. The method of the invention in the patent provides grooves and holes in the lead frame so as to have good mechanical integrity between the two surfaces.

U.S. Pat. No. 6,916,433 attempts to improve performance by using conductive fillers with dendrites or protrusions to enhance contact with electrodes and an elastic adhesive resin for enhanced flexibility. The preferred elastic adhesive is a thermosetting resin comprising denatured silicon resin with a dispersed epoxy resin, available from Cemedyne Co. Ltd.

Through diligent research the present inventors have developed method of improving adhesive strength between the lead frame and the cathode layer which circumvents the problems encountered using the prior art adhesives and fillers.

BRIEF DESCRIPTION OF THE INVENTION

It is an object of the present invention to provide a secondary adhesive adjacent to a conductive adhesive to increase adhesion between the lead frame and the cathode layer. The secondary adhesive can be conductive or nonconductive adhesive.

It is another object of the present invention to provide a capacitor with secondary adhesive so as to have improved stress absorption capability.

A particular feature of the present invention is the ability to provide the improvements with minor changes to the manufacturing method and with improved product yields due to improved thermomechanical properties.

It is another object of the present invention to provide a capacitor with secondary adhesive which can be cured by either thermal cure or cure by irradiation.

It is another object of the present invention to provide a capacitor with secondary adhesive which can be co-cured with conductive adhesive These and other objectives are achieved by supplementing a conductive thermosetting adhesive between Ag layer and lead frame with at least one secondary adhesive, preferably applied at the same time as the conductive thermosetting adhesive is applied.

BRIEF DESCRIPTION OF THE DRAWINGS

FIGS. 3A and 3B show alternative embodiments of the invention.

FIG. 4 illustrates one arrangement for manufacturing the invention.

DETAILED DESCRIPTION OF THE INVENTION

The present invention mitigates the deficiencies of the prior art by providing improved adhesion with minor changes in processing. The present invention will be described with reference to the various figures which illustrate, without limiting, the invention.

Figure 1:
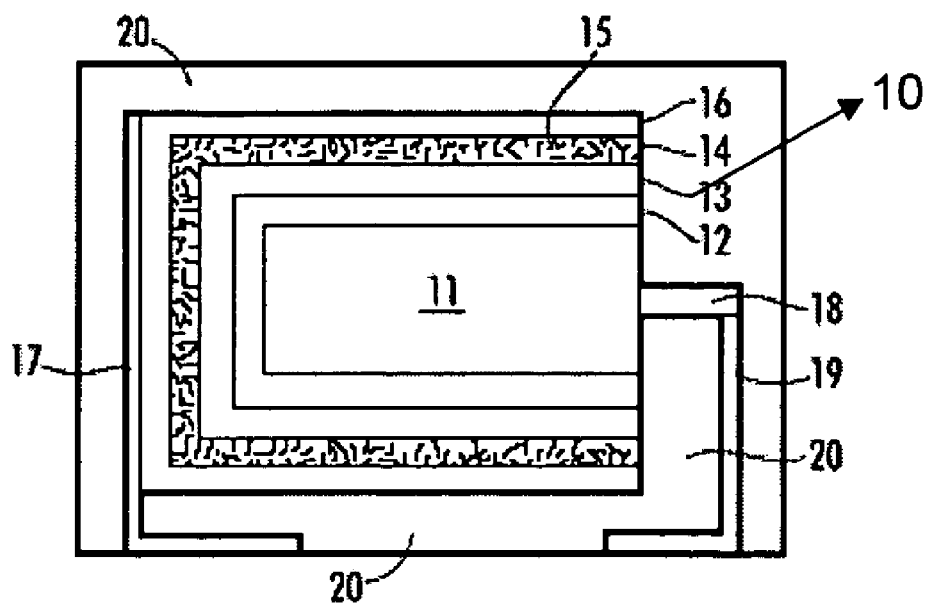
FIG. 1 is a schematic representation of a conventional capacitor chip type electrolytic capacitor.

In FIG. 1, a cross-sectional view of a chip type electrolytic capacitor is shown as represented at 10. The capacitor comprises an anode 11, comprising a valve metal as described herein. A dielectric layer 12 is provided on the surface of the anode 11. The dielectric layer is preferably formed as an oxide of the valve metal as further described herein. Coated on the surface of the dielectric layer 12, is a conductive layer 13. The conductive layer preferably comprises conductive polymer, such as polyethylenedioxythiophene (PEDT), polyaniline or polypyrrole or their derivatives; manganese dioxide, lead oxide or combinations thereof. A carbon layer 14, preferably comprising carbon nanotubes 15, is provided as a chemical barrier between the conductive layer and subsequent layers. A silver layer 16, forms a direct electrical contact with the cathode terminal 17, such that current flows from the cathode terminal through the successive layers sequentially. The carbon layer together with the silver layer provides a strongly adhered conductive path between the conductive layer 13, and the cathode terminal 17. An anode wire 18, provides electrical contact between the anode 11, and an anode terminal 19. The entire element, except for the terminus of the terminals, is then preferably encased in a non-conducting casing material 20, such as an epoxy resin.

Figure 2:
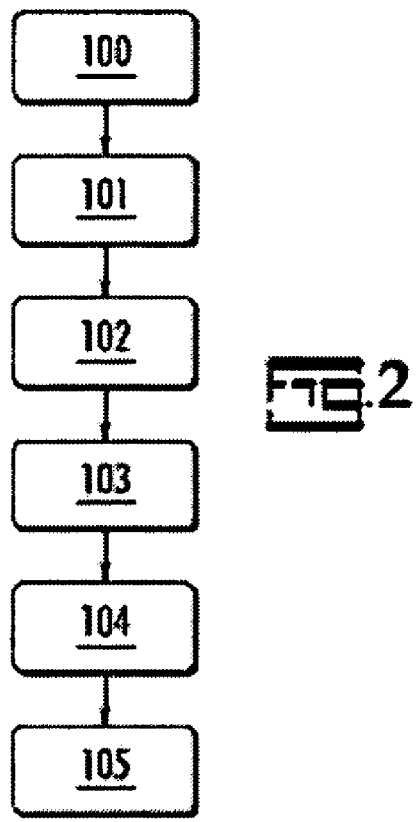
FIG. 2 is a flow chart representation of the process of the present invention.

The process for making such a capacitor is shown diagrammatically in FIG. 2. The valve-metal 100 is preferably selected from niobium, aluminium, tantalum, titanium, zirconium, hafnium, tungsten and alloys or combinations thereof. Aluminium, tantalum and niobium are most preferred. Aluminium is typically employed as a foil while tantalum is typically prepared by pressing tantalum powder and sintering to form a compact. For convenience in handling, the valve metal is typically attached to a carrier thereby allowing large numbers of elements to be processed at the same time.

The valve metal is preferably etched to increase the surface area particularly if the valve metal is a foil such as aluminium foil. Etching is preferably done by immersing the valve metal into at least one etching bath. Various etching baths are taught in the art and the method used for etching the valve metal is not limited herein.

A dielectric 101 is formed on the exterior of the valve metal. It is most desirable that the dielectric layer be an oxide of the valve metal. The oxide is preferably formed by dipping the valve metal into an electrolyte solution and applying a positive voltage to the valve metal. Electrolytes for the oxide formation can include ethylene glycol as described in U.S. Pat. No. 5,716,511; alkanolamines and phosphoric acid, as described in U.S. Pat. No. 6,480,371; polar aprotic solvent solutions of phosphoric acid as described in U.K. Pat. No. GB 2,168,383 and U.S. Pat. No. 5,185,075; complexes of polar aprotic solvents with protonated amines as described in U.S. Pat. No. 4,812,951 or the like. Electrolytes for formation of the oxide on the valve metal including aqueous solutions of dicarboxylic acids, such as ammonium adipate are also known. Other materials such as phosphates, citrates, etc may be incorporated into the oxide to impart thermal stability or chemical or hydration resistance to the oxide layer.

A conductive layer 102 is formed on the surface of the oxide. The conductive layer acts as the cathode of the capacitor. The cathode can be an organic material and particularly intrinsically conducting polymers. Mentioned as exemplary polymers are 7,7',8,8'-tetracyanoquinodimethane complex, polymerized aniline, polymerized pyrrole, polymerized thiophenes, and derivatives thereof. The cathode layer can also comprise manganese dioxide. The manganese dioxide layer is preferably obtained by immersing an anode element in an aqueous manganese nitrate solution. The manganese oxide is then formed by thermally decomposing the nitrate at a temperature of from 200° to 350° C. in a dry or steam atmosphere. The anode may be treated multiple times to insure optimum coverage.

The conducting polymer is preferably chosen from polypyrroles, polyanilines, polythiophenes and polymers comprising repeating units of Formula I, particularly in combination with organic sulphates:

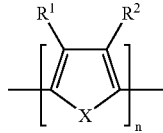

FORMULA 1

Wherein $R^1$ and $R^2$ are chosen to prohibit polymerization at the beta-site of the ring and X is S, Se or N and n is an integer from 3-20.

A particularly preferred monomer is 3,4-polyethylene dioxythiophene (PEDT).

The polymer can be applied by any technique commonly employed in forming layers on a capacitor including spraying oxidizer dopant and monomer onto the pellet or foil, allowing the polymerization to occur for a set time, and ending the polymerization with a wash. The polymer can also be applied by electrolytic deposition or chemical oxidative polymerization as well known in the art.

After conductive 102 layer formation, a carbon layer 103 is applied by spraying or dipping.

A silver layer 104 is applied onto the carbon layer preferably by spraying or dipping.

It is preferred that each layer be at least partially dried prior to coating of the subsequent layer thereon. Alternatively, the layers may be coated in a wet-on-wet fashion with adequate surface tension in each layer to prohibit substantial mixing of the layers. The layers can then be dried, or cured, simultaneously.

The capacitor 105 is finished by incorporating anode and cathode terminals and external insulators as known in the art. The conductive adhesive is typically used to adhesively attach the silver layer to the lead frame which serves as the cathode lead.

Conductive adhesives containing sufficient concentrations of metal particles to achieve a low ESR in the completed capacitor are not as strong as adhesives as would be the adhesive sans particles. As a result, mechanical strength of the connection is compromised and shock and heat sensitivity are greater. To obtain improved adhesion while maintaining acceptably low ESR, we have developed a capacitor and a process for making a capacitor using both conductive and secondary adhesives to join the Ag layer of the cathode to the cathode terminal. The secondary adhesive can be conductive or nonconductive adhesive Commercial conductive adhesives used in the electronics industry are isotropic, silver-filled thermosetting epoxies sold as thixotropic pastes. These one-pot adhesives are derived from two-part systems and use heat to activate a catalyst or hardner within the paste. Silicone and polyamides also have been used with limited success. Silver is preferred as the conductive filler although Au, Ni, Cu and C are used. Oxidation of non-precious metals is a problem which restricts their use. Loctite®, and Emerson and Cuming® are among typical suppliers.

Fillers limit the strength of an adhesive bond by disrupting the linkages in the adhesive and increasing the distance between bound surfaces. Adhesion strength decreases as filler concentration is increased. However as filler concentration increases, the thermal coefficient of expansion decreases. An optimized concentration of fillers need to be used so as to have higher adhesion strength and low coefficient of thermal expansion. Nanomaterials such as nanoclays, carbon nanotubes, carbon nanofibers, molecular silica, nanometal powders, and other similar fillers can provide lower coefficient of thermal expansion with lower concentration of fillers. This is due to the nanoscale or molecular level interaction of these fillers with the matrix binder or resin system. Such fillers can be used in the secondary adhesive composition to get good adhesion strength and low coefficient of thermal expansion Conductive and non-conductive fillers such as $SiO_2$, nanoclay, carbon nanotubes, carbon nanofibers, molecular silica, nickel, copper, silver, silver coated copper, silver coated nickel, Ni coated carbon, carbon fibers, glass fibers, carbon black, graphite, etc may be added to a thermosetting adhesive to control for viscosity and thermal expansion to duplicate the physical properties of a conductive adhesive. When a secondary adhesive is used to augment the strength of a conductive adhesive, conductive and nonconductive fillers may be used to correct for adhesive thickness and thermal expansion so that the adhered surfaces will remain parallel to each other throughout multiple temperature cycle. Different fillers may also be used to amend the properties of the secondary adhesive when different epoxies are used on the same capacitor.

FIGS. 3A and 3B illustrate the invention in alternate embodiments. In FIG. 3A, secondary adhesive 33 is applied on the negative side of the negative lead and conductive adhesive 31 is applied to the positive side. In FIG. 3B, the positions of conductive and secondary adhesive are reversed.

FIG. 4 illustrates a preferred process for applying the adhesives. Cathode terminal 17, one of many such on a master plate, passes under adhesive dispensers 51, 53, which deposit adhesive on the positive side 41 or on negative side 43 as desired prior to joining the terminal with the cathode side of the capacitor.

For larger case sizes, multiple dots or stripes of both adhesives may be applied. In the preferred embodiment, the conductive and secondary adhesives are co-cured.

The invention and its utility are illustrated by the following examples.

EXAMPLE

Tantalum Pellets with dimensions of 4.62×3.25×0.81 mm (0.182×0.128×0.032 inches) were pressed from commercially available capacitor grade tantalum powder. The pellets were sintered to create tantalum anodes with 48,000 CV/g. The pellets were anodized in a phosphoric acid and water electrolyte to 21 volts at 60° C. The pellets were impregnated with poly (3,4-ethylenedioxythiophene) (commercially available as BAYTRON M™ from HC Starck) using an iron tosylate chemical oxidation process. In all samples the parts were dipped in a standard commercially available carbon suspension formulation and were subsequently dipped in silver paint, attached to lead frames using conductive adhesive and encapsulated in a transfer molding process. Conductive adhesive Loctite® 3880 was applied to the cathode surface. The control group contained conductive adhesive only. In an inventive group a nonconductive adhesive (Loctite® 3609) was attached adjacent to conductive adhesive. The parts were attached to lead frame and cured simultaneously. Two sample groups were built to evaluate which configuration would provide the strongest bond. In the sample group 1, (FIG. 3B) the conductive adhesive was dispensed on the positive side of the lead frame with the non-conductive adhesive dispensed on the negative side. In the sample group 2 (FIG. 3A), the conductive adhesive was dispensed on the negative side of the lead frame with the non-conductive adhesive dispensed on the negative side. Peel strength testing (proprietary device) was used to measure the force required to break the negative plates after construction of the lead frame to the cathode. The test was performed at room temperature (cold peel) and at 162° C. (hot peel). The peel strength at room temperature and hot temperatures were measured and the results are tabulated in Table 1

TABLE 1

| Non-conductive application | Cold Peel Strength [Mean Kg] | Hot Peel Strength [Mean Kg] |
| --- | --- | --- |
| Control | 0.514428571 | 0.181428571 |
| Positive Side | 1.949285714 | 0.222857143 |
| Negative Side | 2.131428571 | 0.366428571 |

The results presented in Table 1 clearly demonstrate a higher cold peel strength and hot peel strength for the method of this invention and particularly for the use of a non-conductive adhesive on the negative side of the frame.

The invention has been described in terms of the preferred embodiments. One of skill in the art would realize additional embodiments, alterations, and advances which, though not enumerated, are within the invention as set forth more specifically in the claims appended hereto.

What is claimed is:

1. A capacitor comprising:
an anode;
an anode lead wire;
an anode terminal;
an insulating layer on said anode;
at least one cathode layer on said insulating layer;
a cathode lead adhered to said cathodic layer; and a cathode terminal;

wherein a conductive adhesive and a nonconductive secondary adhesive are used to adhere said cathode lead to said cathodic layer.

2. A capacitor according to claim 1 wherein the conductive adhesive and secondary adhesive comprise the same adhesive resin.

3. A capacitor according to claim 1 where the conductive adhesive and secondary adhesive comprise different adhesive resins.

4. A capacitor according to claim 1 wherein at least one of said conductive adhesive and said secondary adhesive is thermosetting adhesive.

5. A capacitor according to claim 1 wherein said conductive adhesive contains particles of metals selected from the group consisting of Ag, Au, Ni and Cu.

6. A capacitor according to claim 5 wherein said particles are Ag particles.

7. A capacitor according to claim 1 wherein said secondary adhesive contains particles selected from the group consisting of molecular silica and nanoclay.

8. A capacitor according to claim 1 wherein the secondary adhesive is placed on the negative side of the cathode lead.

9. A method for bonding a capacitor to a lead frame comprising dispensing a non-conductive secondary adhesive adjacent to a conductive adhesive on a cathode lead frame.

10. A method according to claim 9 wherein said secondary adhesive is applied on the negative side of a cathode lead frame.

11. A method according to claim 9 wherein the conductive adhesive and secondary adhesive are co-cured.

* * * * *